Aug. 3, 1948.　　　M. VITOUX　　　2,446,203
PNEUMATICALLY OPERATED MENDING DEVICE
Filed Nov. 20, 1946
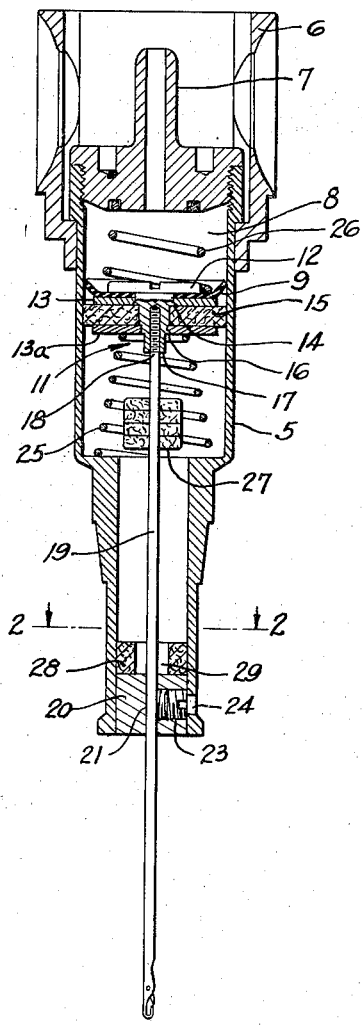
*Fig. 1*
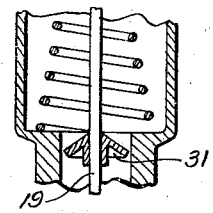
*Fig. 4*
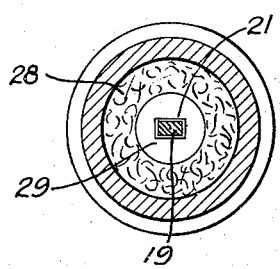
*Fig. 3*
*Fig. 2*
INVENTOR.
MARCEL VITOUX
BY
Richards & Geier
ATTORNEYS Patented Aug. 3, 1948

2,446,203

UNITED STATES PATENT OFFICE 2,446,203

PNEUMATICALLY OPERATED MENDING DEVICE

Marcel Vitoux, Paris, France, assignor to American Vitos Company, Inc., New York, N. Y., a corporation of New York Application November 20, 1946, Serial No. 711,165 In France June 22, 1944

Section 1, Public Law 690, August 8, 1946 Patent expires June 22, 1964

6 Claims. (Cl. 66—1.5)

This invention relates to pneumatic knitting devices used in mending hosiery and other knitted goods and more particularly to the cylinder and piston type of such devices wherein the knitting needle forms the piston stem or rod.

One object of the invention is to provide means in a device of this nature which will effectively prevent the soiling of articles being repaired, by the lubricant used, without in any way effecting the smoothness of operation of the device.

Another object of the invention is the provision of means which may be directly mounted on the piston stem or needle which will either absorb, collect or deflect any lubricating oil dropped thereon from the piston.

Another object of the invention is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to denote corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In carrying out the objects of the present invention, it was found advantageous to mount an absorbent washer unit on the needle below the piston to receive and absorb any drops of oil which may trickle down said needle from said piston. It was also found advantageous to provide an absorbent packing washer directly below the piston to absorb and thereby reduce to a minimum the leakage of the lubricant below the piston. Furthermore a sleeve is provided near the bottom of the casing to absorb any lubricant which may trickle down the inner walls of the cylinder or casing, before such lubricant reaches the needle.

In another form of the invention it was found desirable to provide a cupel for collecting any drops of oil from the piston, and in still another form a deflector is provided for deflecting the oil towards or on to the walls to be absorbed by the sleeve aforementioned.

The invention will appear more clearly from the following detailed description when taken in connection with the accompanying drawings in which—

Figure 1 is a longitudinal sectional view through a reweaving device made in accordance with the present invention;

Figure 2 is a sectional view taken on line 2—2 of Figure 1;

Figure 3 is a fragmental detail view of a modified form of the invention; and

Figure 4 is a similar view to Figure 3 of a still further modified form.

Referring now to the drawings in detail, the numeral 5 indicates the cylinder or casing of the knitting device which is provided near the top thereof with a collar or finger piece 6 by which it is held by the operator in an oblique position with respect to the article being repaired. Located within the finger piece 6 and removably secured to the cylinder is a nozzle 7 for attaching the device to a source of compressed air by means of a tube or hose not shown.

Slidably positioned in the upper bore 8 is a cup shaped leather piston 9 centrally perforated to receive the enlarged shoulder portion 10 of a stud 11 provided with a head 12. A metal washer 13 is secured to the stud shoulder 10 beneath the base of the cup shaped piston 9 by upsetting the shoulder 10 at 14 and forming a rivet of same. Beneath the metal washer 13 there is a packing washer 15 made of absorbent material, said washer being of the same diameter at the inner bore 8 of the cylinder 5. A metal washer 13a is riveted in place by upsetting the end of a shoulder 16 upon which the said washer 13a is positioned. With the above construction the piston 9 is clamped between the head 12 and washer 13 and the packing washer 15 is clamped between the washers 13 and 13a, all of which elements are either mounted on or unitary with the stud 11 which at the lower end thereof is provided with a hub or boss 17. The said hub 17 and body of the stud 11 is provided with a central screw threaded bore into which is threaded the upper end 18 of the reweaving needle 19 which forms the piston rod or stem of the device.

The needle 19 passes through a bushing 20 at the bottom of the cylinder, the said bushing being self lubricating and provided with a rectangular slot or opening 21 which corresponds to the cross-section of the needle 19. The said bushing is maintained in a cylinder bore 22 by means of a set screw 23 which is drawn up against the circumference of said bore. A hole 24 provides access to the said screw for loosening or tightening same.

It is well known that by making the needle guide bushing of materials having self-lubricating qualities, the use of oil as a lubricant may be dispensed with at that point of the device. However, the piston requires continuous lubrication, and for this purpose oil or other lubricant is poured into the bore 8 above the piston 9. Such lubricant will to a great extent be maintained above the piston by the packing washer 15. However some of the lubricant will find its way to a position below said packing washer due to the oscillations of the piston and packing washer and may drop upon the needle 19, seep through the bushing 20 and then fall upon the article being repaired. The oscillation of the piston is caused by the air pressure through the nozzle 7 and the return pressure of the spring 25. A shock absorbing spring 26 is provided above the piston.

In order to obviate this undesirable feature, there is provided an absorbing unit 27 which comprises a plurality of absorbent washers tightly maintained on the needle 19 below the piston mechanism. It will be seen that if any oil drops from the said piston mechanism on to the needle, same will be absorbed by the said absorbing unit 27. Likewise any lubricant which may find its way down along the inner walls or surfaces of the bores 8 and 22 will be absorbed by an absorbent sleeve 28 which fits tightly against the bore 22 but is provided with an opening 29 considerably larger than the greatest thickness of the needle.

Instead of the absorbing unit 27, one or more cupels 30 shown in Figure 3 may be provided on the needle 19 for collecting any drops of oil which may drop from the piston.

This latter means may be replaced if desirable by a deflecting member 31 shown in Figure 4. In this last form any oil which may drop on the deflecting member 31, will be deflected against the walls of the bore 22 and be absorbed by the sleeve 28. It is to be understood that any time desirable the needle, guiding bushing and absorbing, collecting and/or deflecting means may be removed and replaced by other such element.

From the foregoing it will be seen that the present invention provides means for effectively preventing the soiling of articles being mended, by lubricating oil or the like, by means of absorbtion, collection or deflection or by a combination of same.

It is apparent that wide variations and modifications may be made without departing from the scope of the invention as set forth in the claims, all of which variations and modifications are to be included within the scope of the present invention.

What is claimed is:

1. In a pneumatically operated device for mending knitted goods, said device including a cylinder and a reciprocating piston in said cylinder, the said cylinder being adapted to contain liquid lubricant above the piston, a mending needle connected to the piston and depending therefrom downwardly and outwardly of the cylinder, and means carried by said needle below the piston for preventing any lubricant which may drop onto the needle from seeping therefrom outwardly of the cylinder to the article being mended.

2. In a pneumatically operated device for mending knitted goods, said device including a cylinder and a reciprocating piston in said cylinder, the said cylinder being adapted to contain liquid lubricant above the piston, a mending needle connected to the piston and depending therefrom downwardly and outwardly of the cylinder and means carried by said needle below the piston for preventing any lubricant which may drop onto the needle from seeping therefrom outwardly of the cylinder to the article being mended, said means comprising an absorbing unit for absorbing such dropping lubricant.

3. In a pneumatically operated device for mending knitted goods, said device including a cylinder and a reciprocating piston in said cylinder, the said cylinder being adapted to contain liquid lubricant above the piston, a mending needle connected to the piston and depending therefrom downwardly and outwardly of the cylinder, and means carried by said needle below the piston for preventing any lubricant which may drop onto the needle from seeping therefrom outwardly of the cylinder to the article being mended, said means comprising at least one cupel for collecting such dropping lubricant.

4. In a pneumatically operated device for mending knitted goods, said device including a cylinder and a reciprocating piston in said cylinder, the said cylinder being adapted to contain liquid lubricant above the piston, a mending needle connected to the piston and depending therefrom downwardly and outwardly of the cylinder, a needle guiding bushing at the bottom of the cylinder, and an absorbent sleeve in contact with the inner surface of the cylinder at said bushing for collecting any lubricant which may run down said surface, the said sleeve having a central hole through which the needle passes, the diameter of said hole being larger than the largest cross section of the needle.

5. A device according to claim 4 wherein the needle is provided with means below the piston for deflecting any lubricant that may drop thereon towards the inner surface of the cylinder to be absorbed by the said sleeve.

6. A device according to claim 1, and absorbent means near the bottom of the cylinder in contact with the inner surface thereof but out of contact with the needle to absorb any lubricant which may run down said inner surface of the cylinder and prevents same from reaching the needle.

MARCEL VITOUX.